Patented Feb. 21, 1939

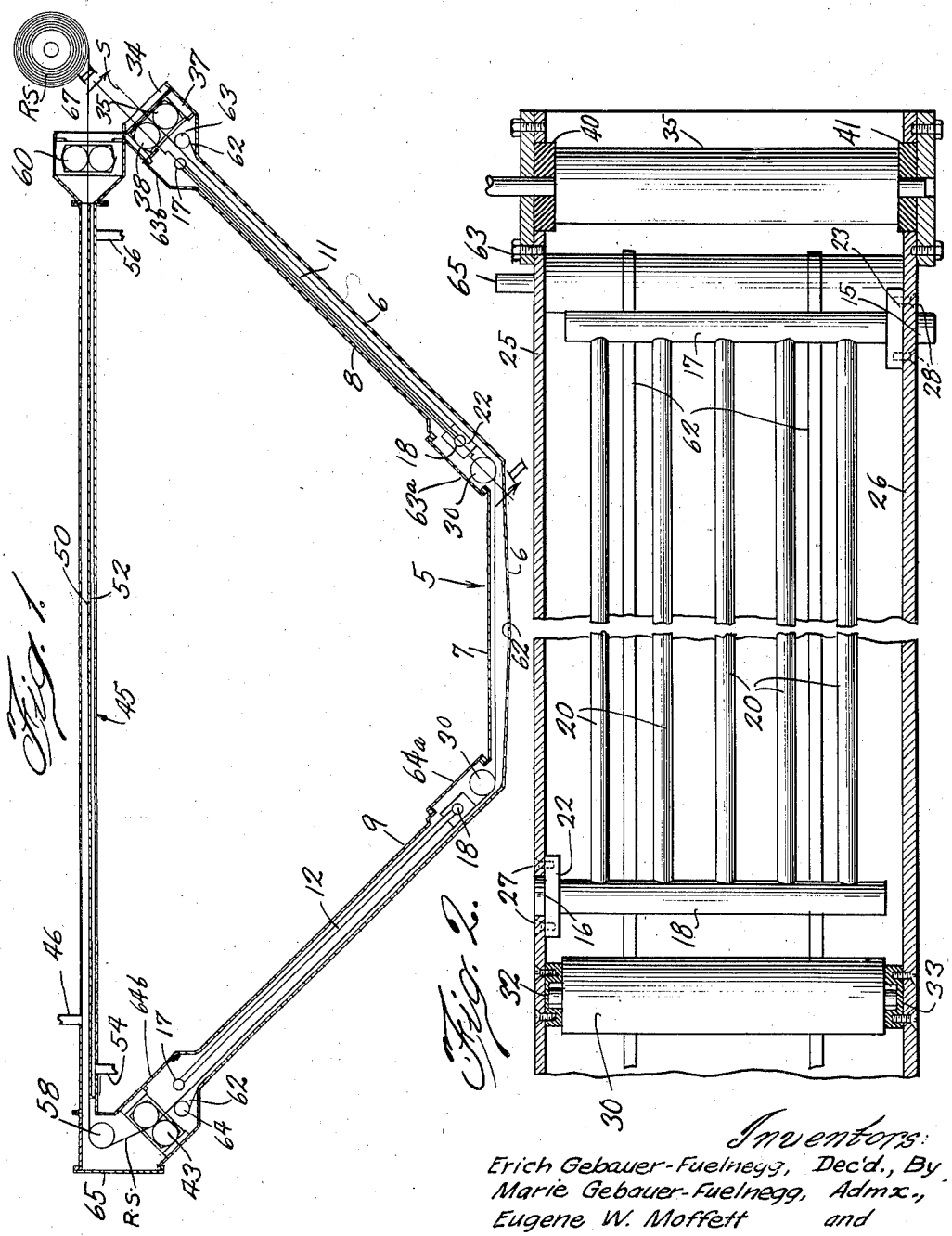

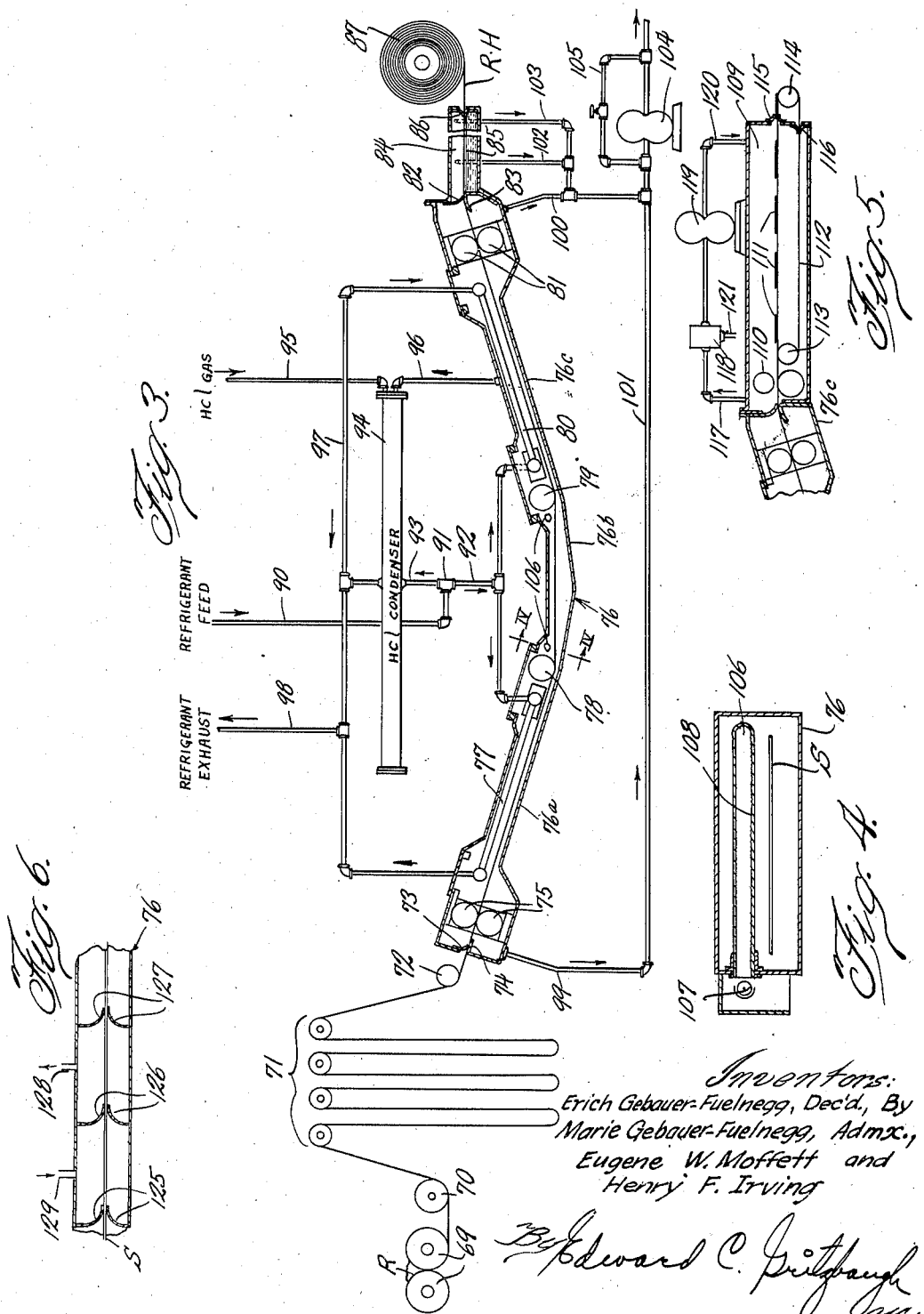

2,147,739

UNITED STATES PATENT OFFICE

2,147,739

CONTINUOUS PROCESS FOR REACTING ORGANIC WEB MATERIALS WITH LIQUEFIED REAGENTS

Erich Gebauer-Fuelnegg, deceased, late of Evanston, Ill., by Marie Gebauer-Fuelnegg, Evanston, Ill., administratrix, Eugene W. Moffett, Chicago, Ill., and Henry F. Irving, Gary, Ind., assignors to Marbon Corporation, a corporation of Delaware Application September 17, 1936, Serial No. 101,270

2 Claims. (Cl. 260—11)

This invention relates to a process for exposing web material to liquefied reagents at low temperature. More specifically this invention relates to a continuous process for reacting strips of organic material with liquid reagents that are normally gaseous in form and includes apparatus for carrying out the process.

The treating of materials in sheet or web form by a continuous process is relatively simple when the treatment is effected at ordinary temperatures. However, the problem becomes more difficult when the treatment involves the use of reagents which boil or vaporize at very low temperatures and when it is desirable to effect the treatment with such reagents in liquefied form.

For example, in the preparation of rubber-halogen compounds or rubber hydro-halogen compounds, it is desirable to maintain the halogen or hydro-halide reagents in liquefied form so that the same may be intimately contacted with strips of rubber without loss of reagent. Commercial production also requires that a continuous process be utilized. Our invention makes possible the continuous reaction of organic sheet materials such as sheet rubber with liquefied hydro-halides whereby the sheet material is exposed to or passed through a bath of the liquefied reagent. Obviously the reaction must be carried out at very low temperatures to maintain these reagents in liquefied form.

We have therefore provided a device for continually carrying out the process at low temperatures without loss of reagents through volatilization.

It is an object of this invention to provide a continuous process for treating a sheet material with a highly volatile liquid reagent.

It is another object of this invention to provide a process for continually reacting organic sheet material with liquefied reagents that are normally gaseous in form.

A specific object of this invention is to provide a continuous process for producing rubber halides and rubber hydro-halides by reacting rubber sheets with liquefied halides of hydro-halides at low temperatures.

A further object of this invention is to provide a device for treating sheet materials with highly volatile liquid reagents without wasting the liquid reagents.

A further object of this invention is to provide an apparatus for continuously exposing web materials to liquefied reagents at low temperatures.

A still further object of this invention is to provide a reactor for carrying out low temperature chemical reactions on organic sheet materials.

Other and further objects of this invention will be apparent from the following specification and accompanying sheets of drawings which form a part of this specification.

On the drawings:

Figure 1 is a vertical cross sectional view of one form of reactor apparatus according to this invention.

Figure 2 is a broken enlarged sectional view taken substantially along the line II—II of Fig. 1 with parts in elevation.

Figure 3 is a vertical sectional view, with parts in elevation, of a modified form of apparatus according to this invention and illustrating the circulating system.

Figure 4 is a sectional view taken substantially along the line IV—IV of Fig. 3 showing apparatus for accelerating the reaction by the use of actinic light rays.

Figure 5 is an enlarged fragmentary sectional view of a modified form of removal chamber which may be used in the apparatus.

Figure 6 is a sectional view of a form of triple seal that may be used to close the reactor.

As shown on the drawings:

In Figs. 1 and 2, a U-shaped or curved immersion or reaction chamber 5, adapted to hold liquefied reagents, is formed of a bottom plate 6, top plates 7, 8 and 9 and side plates 25 and 26. The end portions of the chamber 5 slope upwardly, as shown, so that the mid-section may be completely filled with reagents.

A pair of cooling devices 11 and 12 are located in the sloping portions of the chamber 5. Each cooling device 11 and 12 comprises headers 17 and 18 connected by a series of tubes or pipes 20.

The cooling devices 11 and 12 may be supported within the chamber 5 by means of flanges 22 and 23 which are attached to the side plates 25 and 26 by means of screws 27 and 28.

Idler rollers 30 are placed at the bottom of the chamber 5 adjacent to the sloping legs thereof for directing the sheet material through the reactor as will be hereinafter described. The rollers 30 are preferably mounted on roller bearings 32 and 33 (Fig. 2). It should be understood that other directing means such, as for example, a curved plate may be used in place of the rollers 30.

Sheet material to be treated according to this invention enters the reactor chamber 5 through the right hand sloping leg thereof between a roller assembly 34 comprising a pair of rubber rollers 35 which may be driven by any suitable source of power (not shown). The rubber rollers 35 serve to guide the sheet material into the reactor chamber 5 and also prevent the escape of vapors from the reactor chamber. Blocks 37 and 38 of rubber, leather or other suitable material are placed at either side of the rollers 35 in contact therewith to prevent vapors from escaping around the peripheries of the rollers. Blocks 40 and 41 of rubber or other suitable material are placed at either end of the rollers 35 to prevent passage of vapors around the ends thereof. A similar assembly of rollers and blocks 43 is located at the opposite end of the reactor chamber 5 in the top of the left hand sloping leg thereof.

An elongated horizontal heating unit 45 is placed across the top of the U-shape reactor chamber 5 to heat the reacted sheet material to room temperatures and to vaporize the treating liquid therefrom. The heating unit 45 comprises two portions 50 and 52. The lower portion 52 is supplied with steam or hot water from any convenient source through openings 54 and 56. The upper portion 50 is for the passage of the sheet material over the heated chamber 52. An idler roller 58 similar in construction and mounting to the rollers 30 guides the sheet from the roller assembly 43 into the space 50. An additional roller assembly 60 similar to the assembly at 34 delivers the sheet from the space 50 to the atmosphere where it may be wound into a roll such as 61.

It should be understood, that the interior of the U-shaped reaction chamber 5 is formed of a corrosion resistance composition since, in many instances, the liquefied reagents within the reactor chamber 5 are corrosive in nature. If desired, corrosion resistant metallic strips or belts 62 may be trained around rollers 63 and 64 positioned in the upper portions of the sloping legs of the reactor chamber 5 and directed under the rollers 30 for providing a support for the rubber sheet as it passes through the chamber. These conveyor belts or strips may be formed of tantalum which is inert to the action of the liquefied reagents therein. The belt may be driven by the roller 63 through a suitable source of power (not shown) connected with the shaft 65 (Fig. 2).

From the above description of Figs. 1 and 2, it is evident that the sheet or web "S" of organic material passes through the nip of the rollers 35 into the reactor chamber 5 whereupon it is cooled by the refrigerating element therein and conveyed by the tantalum belt 62 downwardly into a bath of the liquefied reagent in the mid-portion of the reactor chamber 5. The sheet is then directed over the rollers 30 across the bottom of the reactor chamber and upwardly between the nip of the rollers 43. During this passage through the reactor chamber 5, the sheet has undergone a chemical change and the reacted sheet "RS" is next directed through the removal chamber 45 over the pan 52 therein where any reagents from the reactor chamber 5 remaining on or in the sheet are gasified. The reacted sheet is then removed through the last seal between the rollers 60 and wound into a roll 61.

In the second sheet of drawings the modified form of apparatus thereon is shown as specifically adapted for the reaction of thin rubber sheets with liquefied hydrogen chloride to produce rubber hydrochloride.

As shown in Fig. 3, rubber "R" is milled between rollers 69 into a thin sheet S. The sheet S passes under a slitter 70 to trim the rough edges therefrom and then into a festooning device 71 where it is allowed to cool. The festooner 71 also permits flexibility to the feeding of the sheet S into the reactor.

The sheet S from the festooning device 71 passes under a roller 72 and through a double seal located in the upper end of the sloping leg 76a of the reactor 76.

The double seal is composed of flexible metallic or rubberized strips 73 and 74 adapted to scrape against the sheet S. After passing between the flexible strips 73 and 74, the sheet is directed into the nip between rollers 75 similar to the sealing rollers described in Fig. 1. The sheet S is then directed under cooling coils 77 similar to the coils described in Figs. 1 and 2 and under a roll 78 into the mid-portion 76b. The mid-portion 76b is flooded with liquefied hydrogen chloride so that the sheet passes through a bath of the liquefied reagent before entering into the sloping leg 76c. Upon leaving the mid-section 76b, the sheet is directed under a roller 79 beneath cooling coils 80 similar to the coils 77 and through a double seal device composed of roller seals 81 and flexible strips 82 and 83.

The sheet S has now undergone a chemical change and a rubber hydro-chloride sheet "R. H." results. The sheet "R. H." is directed from the seals 82 and 83 into an elongated HCl removal chamber 84 having a sealed pan 85 therein heated with water or steam. The sheet "R. H." passes over the heated chamber 85 without coming into contact with the heating medium and is then directed through a seal composed of flexible strips 86 from which it may be wound on a reel 87.

Refrigerant for the cooling coils 77 and 80 in the reactor 76 may be supplied from a suitable source (not shown) through a feed pipe 90 connected with a T connection 91 from which part of the refrigerant is directed into pipes 92 leading to the cooling coils 77 and 80 while the other part is directed through a pipe 93 leading to a hydrogen chloride condenser 94 for liquefying the gaseous reagent fed to the reactor.

Hydrogen chloride gas is fed from a suitable source (not shown) into a feed pipe 95 leading to the condenser 94. The gas is liquefied in the condenser 94 and the liquefied reagent is directed through pipe 96 into the sloping portion 76c of the reactor 76.

The exhaust refrigerant from the cooling coils 77 and 80 and from the condenser 94 is directed through a pipe line 97 into the refrigerant exhaust pipe 98 which is connected to the refrigerating cycle (not shown).

Gasified hydrogen chloride and air in the reactor 76 is removed through pipes 99 and 100 connected with the double seals of the reactor to a pipe 101 having a positive blower 104 therein for feeding the gas and air mixture to a recovery system (not shown) for the recovery of the hydrogen chloride gas. The removal chamber 84 is also exhausted by means of pipes 102 and 103 connected with the removal pipe 101.

In some instances it may be desirable to accelerate the reaction in the reactor chamber 76 by means of actinic rays. For this purpose quartz tubes 106 may be positioned in the reactor as shown in Figs. 3 and 4. It is known that quartz tubes will transmit light, such as ultraviolet rays, freely and deflect the light where desired by merely roughening the interior surface of the tubes at the desired point. Quartz tubes provide a source of light without heat and since the reactor 76 is maintained at very low temperatures, heat from a light source is not desirable. However, in some instances where the reaction being carried out is not effected at extremely low temperatures, it may be advantageous to use direct light sources, such as mercury vapor arcs and the like.

As shown in Fig. 4, the quartz tube 106 receives light from a shielded outside source 107. The interior of the tube 106 is roughened as at 108 over the sheet S so that the light from the source 107 will be directed down against the sheet to accelerate the reaction.

While the tubes 106 are shown in Fig. 3 to be inserted transversely across the portion 76b of the reactor, it should be understood that these tubes may be positioned at many other points without departing from the scope of the invention. For example, quartz tubes may be positioned between and parallel to the cooling coils 77 and 80. A quartz tube or tubes may also be positioned in the removal chamber 84.

Since the removal chamber 84 is necessarily considerably elongated to permit complete removal of the hydrogen chloride gas from the rubber hydro-chloride sheet and since said sheet is very elastic in nature, it may be desirable to modify the removal chamber as shown in Fig. 5.

The removal chamber 109 shown in Fig. 5 is provided with a cutting device 110 to subdivide the reacted sheet emerging from the portion 76c of the reactor 76 into a plurality of sections 111. A conveyor belt 112 is entrained between rollers 113 and 114 to transmit the sections 111 through the removal chambers 109. The conveyor belt 112 may be run at higher speeds than the rate at which the reacted sheet emerges from the reactor so as to provide spaces between each section. Flexible seals 115 and 116 are provided at the end of the removal chamber 109 for sealing the same from the atmosphere.

The gaseous hydrogen chloride and air from the removal chamber 109 may be directed through a removal pipe 117 into a refrigerator device 118 by means of a blower 119. The hydrogen chloride is liquefied in the refrigerator 118 and drained through a drain line 121 from which it may be fed into the reactor 76. The air, freed from the hydrogen chloride, is circulated back into the removal chamber 109 through pipe 120. This closed cycle permits the use of air or other inert gas in the removal chamber so that the chamber may be completely flushed with a conveying medium for any gas liberated by the sheet. It should be understood that the hydrogen chloride gas may be removed from the conveying medium by means other than a refrigerator.

The use of a refrigerating device 118 freezes out any moisture in the conveying gas and prevents the formation of hydrochloric acid in the removal chamber. It is obvious that the hydrogen chloride should preferably remain in a dehydrated condition so that the corrosive hydrochloric acid is not formed to destroy the materials from which the removal chamber is formed.

Other dehydrating means may also be used in place of the refrigerator 118. For example, a sulphuric acid tower or trays containing calcium chloride may be inserted in the pipe line 117 to dehydrate the air or other conveying fluid. However, a refrigerating unit is desirable since it also permits a recovery of hydrogen chloride gas from the conveying fluid.

In place of the double seal shown in Figs. 1 to 3, a form of triple seal arrangement such as is shown in Fig. 6 may be used. As shown in Fig. 6, the sheet S enters between a pair of flexible strips 125 into the reactor chamber 76. However, the sheet also passes between two additional seals 126 and 127. A conduit 128 is positioned between the seals 126 and 127 for withdrawing any HCl gas that may leak thru the seal 127. Another conduit 129 is positioned between the seals 125 and 126 for directing dehydrated air into the space between the seals 125 and 126. In this manner a slight negative pressure is provided in the space between the seals 126 and 127 and a slight positive pressure is created in the space between the seals 125 and 126. This causes a slight inward flow of air from the space under positive pressure into the space maintained under negative pressure thereby preventing an outward flow of any HCl that may leak through the seals 127. The dehydrated air inserted through conduit 129 may be obtained from the pipe 120 (Fig. 5) if desired or from any other source. It is preferably in a dehydrated condition to prevent formation of hydrochloric acid in the space between the seals 126 and 127.

In this manner there is an outward flow of dehydrated air from the portion between the seals 126 and 127 which prevents outside air from entering into the reactor chamber and which also tends to maintain the flexible strips 126 tightly against the sheet S. It should be understood that this triple seal may be used in place of any of the single or double seals shown in Figs. 1 to 3.

In preparing rubber hydrochloride sheets from rubber and liquefied hydrogen chloride, it has been found that ethane serves as an excellent refrigerant. The ethane is preferably compressed in two stages and cooled by means of an ammonia refrigerating cycle. Liquid ethane is fed to the cooling unit and condensing unit at about $-130°$ F. The vaporized ethane is removed from the reactor and condenser. The reaction between the rubber sheet and HCl is carried out at temperatures below $-121°$ F. which is the boiling point of HCl at atmospheric pressure. It is obvious, of course, that other refrigerants may be used with satisfactory results. In many instances, where the reacting agent is liquefied at temperatures not materially below zero an ordinary ammonia or sulphur dioxide refrigerating cycle may be used.

We are aware that many changes may be made and numerous details of construction may be varied through a wide range without departing from the principles of this invention, and we, therefore, do not purpose limiting the patent granted hereon otherwise than necessitated by the prior art.

We claim:

1. The improvement in the method of making rubber hydrochloride which comprises subjecting rubber to the action of hydrogen chloride thereby producing rubber hydrochloride, removing unreacted hydrogen chloride in the gaseous state from the rubber hydrochloride, cooling said hydrogen chloride to liquefy it and freeze out moisture, and recirculating said hydrogen chloride to contact it with unreacted rubber.

2. In the process of making rubber hydrochloride in which rubber is subjected to the action of excess hydrogen chloride whereby rubber hydrochloride, unreacted hydrogen chloride and water are obtained, the steps which comprise removing a mixture of water and unreacted hydrogen chloride in the gaseous state from the rubber hydrochloride, cooling said hydrogen chloride to freeze out the water from it, and recirculating said hydrogen chloride to contact it with unreacted rubber.

MARIE GEBAUER-FUELNEGG,
*Administratrix of the Estate of Erich Gebauer-Fuelnegg, Deceased.*
EUGENE W. MOFFETT.
HENRY F. IRVING.